United States Patent [19]
McCain

[11] Patent Number: 5,801,679
[45] Date of Patent: Sep. 1, 1998

[54] METHOD AND SYSTEM FOR DETERMINING A CURSOR LOCATION WITH RESPECT TO A PLURALITY OF CHARACTER LOCATIONS

[75] Inventor: William C. McCain, Palo Alto, Calif.

[73] Assignee: Novell, Inc., Provo, Utah

[21] Appl. No.: 755,837

[22] Filed: Nov. 26, 1996

[51] Int. Cl.[6] .................................................... G09G 5/08
[52] U.S. Cl. .................................................... 345/145; 345/2
[58] Field of Search .......................... 345/2, 3, 145; 395/200.47, 200.49; 707/513, 523

[56] References Cited

U.S. PATENT DOCUMENTS

| | | | |
|---|---|---|---|
| 5,437,014 | 7/1995 | Busboom et al. | 395/275 |
| 5,745,908 | 4/1998 | Anderson et al. | 707/513 |

OTHER PUBLICATIONS

World Wide Web, Teubner & Associates, Inc., *CORRIDOR Overview*, 1995.
World Wide Web, Simware Corp., *Salvo 3.5 Overview Features and Benefits* date unknown.

*Primary Examiner*—Jeffery Brier
*Attorney, Agent, or Firm*—Dinsmore & Shohl LLP

[57] ABSTRACT

A method and system for determining a specified cursor location with respect to a plurality of text characters displayed on a display device. The method includes determining the content of the displayed text characters, generating an image representative of the displayed text characters, and displaying the generated image on the display device. A user selects a location within the image representative of a desired cursor location with respect to the text characters and the relative location of the selected location within the image is used to assign a cursor location.

17 Claims, 5 Drawing Sheets

METHOD AND SYSTEM FOR DETERMINING A CURSOR LOCATION WITH RESPECT TO A PLURALITY OF CHARACTER LOCATIONS

TECHNICAL FIELD

The present invention relates generally to translating text characters received from a first computer into a format for displaying on a display device coupled to a second computer, and more particularly to determining a user-specified cursor location with respect to the translated text characters.

BACKGROUND OF THE INVENTION

Despite the popularity of personal computers and their proliferation on desktops across the world, much of the relevant data used by individuals on a daily basis exist in mainframe computer environments. Years ago, before it was cost effective to provide each employee with their own computer, an individual would access the mainframe computer from a computer terminal device. Because the functionality of such terminal devices was limited to communicating with a particular mainframe, or host, computer, they were typically less expensive than a full featured computer. Personal computers eventually became inexpensive enough such that they could be provided to each employee, resulting in employees having both a host computer terminal for access to the host computer, and a personal computer for running popular personal computer programs, such as spreadsheets and word processors.

One problem with having both a host computer terminal and a personal computer sitting on a desktop is that there is little room for anything else on the desktop. Eliminating the computer terminal and providing the functionality of the computer terminal on the personal computer was one way to eliminate one of the two devices, and recover some of the space on the desktop. To this end, programs, known as terminal emulators, were developed which, when running on the personal computer, emulate a host computer terminal. The terminal emulator software is capable of communicating with the host computer, and formats and displays the text characters received from the host computer so that the text characters appear on the personal computer substantially the same way the text characters would appear on an actual computer terminal.

To successfully emulate a computer terminal, the emulator software must understand what the host computer is sending, as well as what the host computer expects to receive in response, which will be referred to herein as the information protocol. Although the particular information protocol used varies among the vendors of host computers, one example of such a protocol can be made with reference to one popular host computer, the IBM series of host computers, and a popular computer terminal designed to be coupled to the IBM computer, the IBM 3270 terminal. During a session with a 3270 terminal, an IBM host computer communicates various text characters to a 3270 terminal. Any particular text character can be modifiable or nonmodifiable. The IBM host expects in response from the 3270 terminal any of the following: text characters from the modifiable text fields, a numeric code identifying a particular function key which was activated by the user of the 3270 terminal, and the location of the cursor on the screen at the time the user activated a function key. The IBM host uses this information to provide subsequent processing and communication with the 3270 terminal. Thus, a terminal emulator program which emulates a 3270 terminal likewise needs to communicate to the IBM host the text characters from a modifiable text field, the numeric code identifying the function key pressed by the user, and the location of the cursor with respect to the displayed text characters. Terminal emulators having this capability are well known in the art.

One disadvantage of terminal emulators is that they are fairly complex and relatively expensive programs, and must be loaded on each computer from which access to the host computer is desired. Further, many popular client computer operating systems are in use today, and porting, or modifying, a terminal emulator program which runs on one operating system to run on another operating system is not a trivial task, and is usually not undertaken by the vendor of a terminal emulator program unless sufficient demand exists. Consequently, terminal emulator programs are frequently available for only a limited number of operating systems. Thus, when a user of a computer using an operating system for which no terminal emulator exists wishes to access a host computer, the solution may require installing another computer on the user's desk which can run the terminal emulator. This, of course, results in the original problem of too many devices and too little desktop space.

A relatively recent development in the computer field is the near universal acceptance of a computing paradigm which enables data which has been encoded with a certain command protocol to be viewed on any computing platform capable of running a program which understands the command protocol. The command language is referred to as the HyperText Markup Language (HTML), which is used to generate HTML documents, and a program which reads and interprets the HTML document is referred to as a browser. Browsers exist for practically every popular computing platform, and are relatively inexpensive. Browsers access HTML documents via host computer servers running software which receives from the browser the Uniform Resource Locator (URL) of the HTML document the browser desires, retrieves the document, and forwards the document to the browser. Such server software will be referred to herein as Web server software. The HTML document can include text and/or graphical information and is downloaded to the browser, which interprets the HTML commands, and displays the data on a display device coupled to the computer on which the browser is running.

Because browsers have been developed which run on most popular operating systems, any data encoded with the proper HTML commands can be viewed from practically any computing platform having access to the Web server. This capability has made Web servers and the HTML command language very popular. While the primary function of a Web server is to locate and retrieve requested HTML documents and graphic images referenced in the HTML documents, Web servers can also communicate with extension programs, generally referred to as a gateway program, which can provide additional processing capabilities. Web servers can receive modified text characters and commands from the browser, and pass the text and/or commands to the gateway program, which can then examine the text characters and/or commands and perform desired processing. The gateway program can then create a new HTML document which may contain the results of the desired processing and forward the HTML, via the Web server, to the browser for display on the display device.

One known gateway program provides the ability to translate text characters received from a host, such as an IBM mainframe, into an HTML document, which can be retrieved by a browser running on a client computer. The translation can be such that the text characters appear on the client computer's display device much as they would appear on an actual 3270 terminal. The gateway program can also receive any modified text characters and/or function key activated by the user, and translate this back to a format suitable for receipt by the IBM host computer. This translation process will be referred to herein as text-to-HTML-to-text translation. The gateway program thus provides a translation mechanism by which a user of a browser can engage in a communication session with an IBM host computer.

To simulate the various function keys available on a 3270 terminal, the gateway program encodes each HTML document sent to the browser with several 'buttons', each of which simulates a particular function key. The buttons appear on the display device with the name of the function that they simulate. The user can modify any modifiable text characters and click on a particular function key button. The text characters and function key information will be communicated to the gateway program via the Web server. The gateway program in turn can communicate the text characters and the appropriate function key code associated with the selected function to the IBM host computer.

One advantage of such a text-to-HTML-to-text translation gateway program is that a terminal emulator program is no longer required on the client computer in order to access and manipulate data stored on the host computer. Another advantage is that a user can access the host computer information from any computer having browser software and capable of being connected to the Web server containing the gateway program.

As mentioned above, one item of information used by some host computers is the location of the cursor at the time the user transmitted the information from the client computer to the host computer. The host computer utilizes the cursor location to make certain determinations. For example, one function provided by the host computer is to allow the client computer to request a split screen display, wherein upon request, the screen is divided into two separate windows, each of which can display unrelated information. In this instance, the host computer utilizes the cursor location to determine where the screen should be split. Another use for the cursor location is for selecting a command from a menu of commands. The host computer sends a list of commands to the client computer, and the user specifies a particular command by positioning the cursor on top of the command and transmitting the information back to the host computer. The host computer utilizes the cursor location to determine which command was selected.

One difficulty encountered by translation gateway programs is the lack of support in the HTML language for determining the location of the cursor. In fact, if the text characters in the HTML document are nonmodifiable, a cursor may not exist at all. Because certain host computers expect a cursor location code which identifies the location of the cursor, such translation gateway programs must simulate this functionality.

A typical 3270 terminal allows 80 columns and 24 rows of text characters to be displayed, for a total of 1920 possible cursor locations. One mechanism for simulating the cursor location function is for the gateway program to include in the HTML document a plurality of cursor location 'buttons' such that the buttons are positioned adjacent the text characters at various locations. The user can activate a particular cursor location button to indicate that the cursor location is the same or approximate location as the activated cursor location button. One problem with this method is that only a few of the 1920 possible locations on the screen can be designated as the location of the cursor. This inability to select any of the possible 1920 locations greatly reduces the flexibility provided by the host computer.

Thus, it is apparent that a method and system which allows a user to select any screen location as the location of the cursor would be desirable.

SUMMARY OF THE INVENTION

It is one object of this invention to provide a method and system which allows the selection of a cursor location with respect to any of the plurality of text character locations.

Additional objects, advantages and other novel features of the invention will be set forth in part in the description that follows and, in part, will become apparent to those skilled in the art upon examination of the invention. The objects and advantages of the invention may be realized and obtained by means of the instrumentalities and combinations particularly pointed out in the appended claims.

To achieve the foregoing and other objects in accordance with the purposes of the present invention as described above, a method for determining a specified cursor location with respect to a plurality of text characters displayed on a display device is provided. The method includes displaying a plurality of text characters on a display device, and receiving a request to indicate a cursor location with respect to the displayed text characters. The content of the displayed text characters is determined and a screen image representative of the displayed text characters is generated. The generated screen image is displayed on the display device and a location within the screen image indicative of the desired cursor position with respect to the text characters is selected. The relative position of the selected location within the screen image is used to assign a cursor location with respect to the text characters. The cursor location is then communicated to the host computer.

According to one embodiment of this invention, a plurality of individual character images are maintained, with each individual character image representing a text character displayable on the display device. After receiving the cursor selection request, the screen image is generated by combining a selected group of the individual character images as a function of the displayed text characters. Each text character has a numerical value, and the plurality of individual character images can be maintained in a list which can be indexed by the numerical value of the text character such that indexing the list by the numerical value of a text character retrieves the individual character image representing the corresponding text character. The screen image can be formed by indexing the list with the numerical value of each text character and extracting each individual character image from the list.

The text characters displayed on the display device can have a fixed height and width and can comprise a plurality of columns and rows of text characters. An x- and y-coordinate of the pixel within the screen image which was selected by a user selection device is utilized to determine the cursor location with respect to the text characters.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of other different obvious aspects all without departing from the invention. Accordingly, the drawings and description will be regarded as illustrative in nature and not as restrictive.

BRIEF DESCRIPTION OF THE DRAWINGS

The accompanying drawings incorporated in and forming a part of this specification, illustrate several aspects of the present invention, and together with the description serve to explain the principles of the invention. In the drawings.

Reference will now be made in detail to the present preferred embodiment of the invention, an example of which is illustrated in the accompanying drawings, wherein like numerals indicate the same elements throughout the views.

DETAILED DESCRIPTION OF PREFERRED EMBODIMENTS

Figure 1:
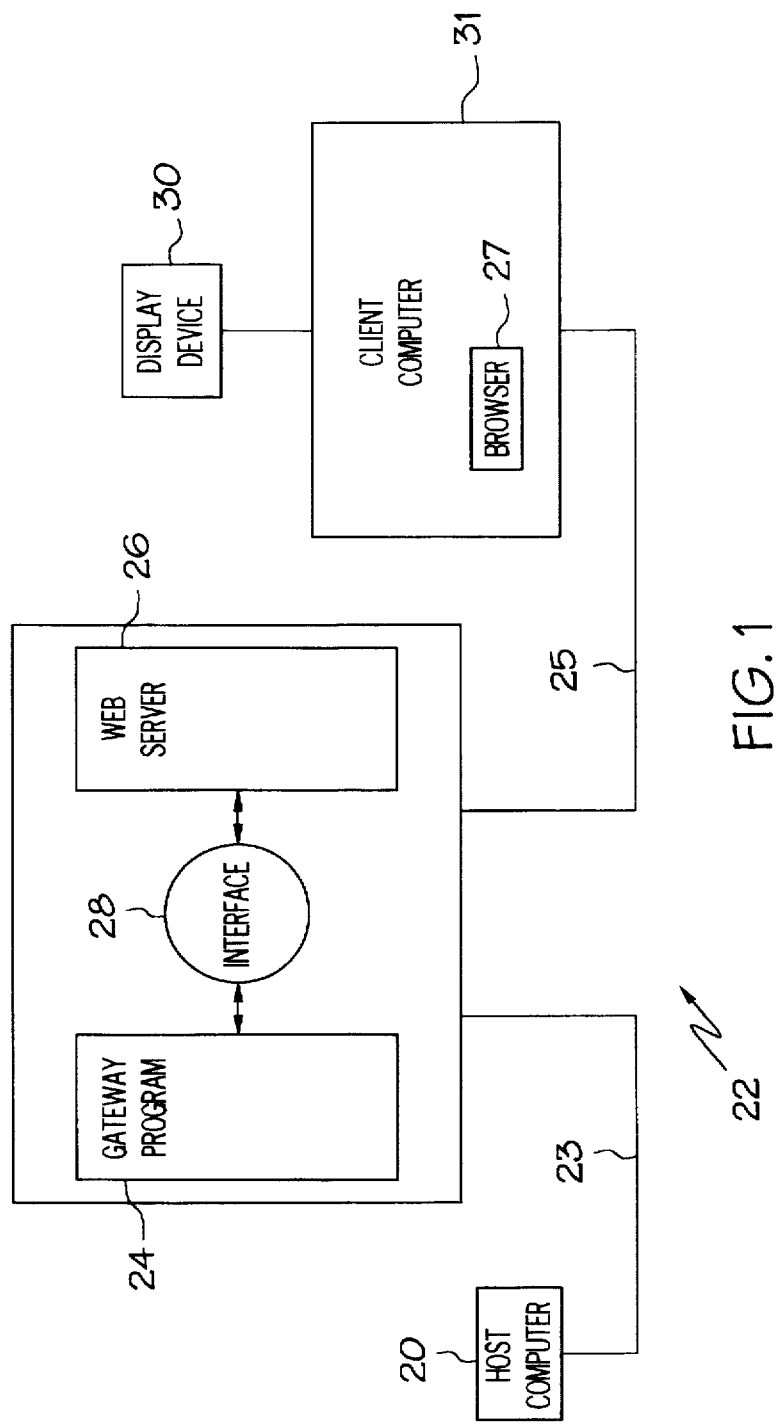
FIG. 1 is a schematic view of an environment in which the method according to this invention can be practiced.

Referring now to the drawings, FIG. 1 shows a computer environment in which the method according to one embodiment of this invention can be practiced. Client computer 31 requests from Web server 26 access to host computer 20 over network 22. Network segments 23 and 25 can comprise any suitable communications medium or mediums suitable to communicate data among host computer 20, Web server 26 and client computer 31. Host computer 20 can comprise any host computer which conveys text characters and/or graphic images to a display device, and can provide functionality based upon a specified cursor location. By text characters it is meant data which is represented by codes, such as ASCII or EBCDIC codes, which is interpreted by a computer to represent a particular character, such as an 'A', or a space, or a carriage return. By image or graphic image it is meant an image that is represented by smaller individual units, such as pixels, with each individual unit comprising data which represents display attributes, such as the color or lack thereof, of the individual unit. Gateway program 24 is an extension to and processes in conjunction with Web server 26 via interface 28. One conventional interface 28 is known as the Common Gateway Interface (CGI). However, other interfaces, such as an Application Programing Interface (API) between gateway program 24 and Web server 26 are also possible depending upon the functionality provided by Web server 26. The ability to extend the functionality of Web server 26 with a gateway program is well known in the art and is discussed, for example, in *The HTML Sourcebook, A Complete Guide to HTML 3.0*, 2nd edition, published by John Wiley & Sons, Inc. For convenience, each individual function of the overall functionality provided by gateway program 24 can be referred to as a segment. Client computer 31 can comprise a conventional computer including the necessary microprocessor and memories to run a program, such as browser 27, and to interact with display device 30.

Client computer 31 can include any operating system, such as Windows, UNIX, or OS/2, for example, for which software which can interpret a command language, such as HTML, can be developed.

Gateway program 24 receives the request to access host computer 20 from client computer 31 and determines if a session needs to be created between host computer 20 and client computer 31, or if a session already exists. Because gateway program 24 maintains a copy of the text characters received for a particular communication session from host 20, if a session between client computer 31 and host computer 20 already exists, gateway program 24 retrieves from memory, such as disk or RAM memory, the previous text characters received from host computer 20 for client computer 31. Gateway program 24 translates the text characters into an HTML document for forwarding to client computer 31. By translating it is meant that gateway program 24 examines the text characters from host computer 20 and inserts the appropriate HTML commands (usually referred to as elements and tags) to cause the generated HTML document to appear on client computer 31 much as the text characters would appear on a host computer terminal. HTML commands are documented in many books, including *The HTML Sourcebook*, referenced above. Browser 27 runs on client computer 31 and interprets the HTML document and displays the document on display device 30. Although for the sake of simplicity the flow of data will frequently be described as being between gateway program 24 and display device 30, the flow of data actually goes from gateway program 24 through interface 28 to browser 27 running on client computer 31, which interprets the HTML document and displays the HTML document on display device 30. Similarly, information transmitted, or sent, from client computer 31 to gateway program 24 actually goes from browser 27 on client computer 31 to Web server 26 through interface 28 to gateway program 24.

If client computer 31 is not yet engaged in a session with host computer 20, gateway program 24 sends a request to host computer 20 to initiate a session with client computer 31, receives the text characters sent from host computer 20, translates the text characters into an HTML document, and communicates the HTML document to display device 30.

Preferably, for aesthetic reasons, gateway program 24 translates the text characters from host computer 20 into an HTML document such that the text characters appear on display device 30 substantially the same as they would on an actual computer terminal coupled to host computer 20. To simulate function keys available on a conventional computer terminal, gateway program 24 can provide an HTML document with a plurality of user selectable buttons, each button corresponding to a particular function key. A user can select a particular button with a selection device, such as a mouse, to simulate the pressing of a particular function key. Upon activating the button, or pressing the appropriate key on client computer 31, information regarding any modified text, and the activated function key are communicated to gateway program 24. Gateway program 24 receives this information and then translates it to a format suitable communication to host computer 20.

The text-to-HTML-to-text translation accomplished by gateway program 24 is transparent to host computer 20, which processes data it receives from gateway program 24 as if host computer 20 were communicating with a computer terminal coupled to host computer 20. Host computer 20 expects certain data to be returned by gateway program 24, including a cursor location with respect to the text characters displayed on display device 30. According to one embodiment of this invention, host computer 20 is an IBM host computer, in which case host computer 20 may expect three items of information from gateway program 24. These three items comprise any text, if any, modified by a user at client computer 31, the code associated with a function key selected by a user at client computer 31, and a cursor location with respect to the text characters displayed on display device 30. Although the invention is described generally with reference to the communication protocol between an IBM host computer and an IBM 3270 or IBM 5250 host terminal, it is apparent that the invention has utility in any application and with any computers in which one computer utilizes cursor location information from another computer.

To obtain some of the information expected by host computer 20, gateway program 24 also stores a copy of the text characters it receives from host computer 20 in a memory, when translating the text characters into an HTML document and forwarding the HTML document to display device 30. The text characters received from host computer 20 can be either modifiable or nonmodifiable. If the text characters are modifiable, gateway program 24 allows the text characters to be modified by inserting the appropriate HTML commands which create modifiable fields of text characters. Gateway program 24 also includes in the HTML document several user selectable buttons which correspond to function keys available on a conventional host computer terminal. The user at client computer 31 then modifies the text on display device 30, as appropriate, and activates a particular function key button with a mouse to simulate pressing a function key available on a host computer terminal. Web server 26 receives the modified text characters and the data identifying which function button was activated and passes the information to gateway program 24. Gateway program 24 can then determine from the received data what data has been modified and which function button has been activated.

However, HTML provides no mechanism for communicating to Web server 26 the location of the cursor with respect to the text displayed on display device 30. The method according to one embodiment of this invention obtains a cursor location with respect to the text characters displayed on display device 30 through the use of an HTML image known as an active image. An active image comprises a plurality of pixels, and can be displayed on display device 30, which is preferably pixel addressable. A user of client computer 31 can move a mouse pointer over the active image displayed on display device 30, and upon activating the mouse, browser 27 will communicate to gateway program 24 the pixel location of the mouse pointer at the time the mouse was activated. By activation, it is meant the mechanism by which the device indicates a selection, such as by clicking a button on the device. According to one embodiment of this invention, gateway program 24 includes in the HTML document a cursor select button which can be selected by a user to indicate that they wish to specify a particular cursor location with respect to the text characters displayed on display device 30. When the cursor select button is selected, gateway program 24 determines the content of the text characters currently displayed on display device 30, converts the text characters into an active image, converts the active image into a suitable graphic format, such as a GIF file, and communicates the GIF file back to client computer 31 for display on display device 30. The active image is an image of the text characters which were displayed on display device 30, and appears substantially the same as the text characters appeared prior to the request to select a cursor location. The user can then use the mouse to indicate a cursor location by activating the mouse pointer at the desired cursor location.

The activation of the mouse sends to gateway program 24 the x- and y-coordinates of the mouse pointer pixel location at the time the mouse was activated. Gateway program 24 uses the pixel coordinates to determine the screen location at which the selection was made. Gateway program 24 then communicates this information to host computer 20, which can utilize the cursor location information in any desired manner.

Figure 2:
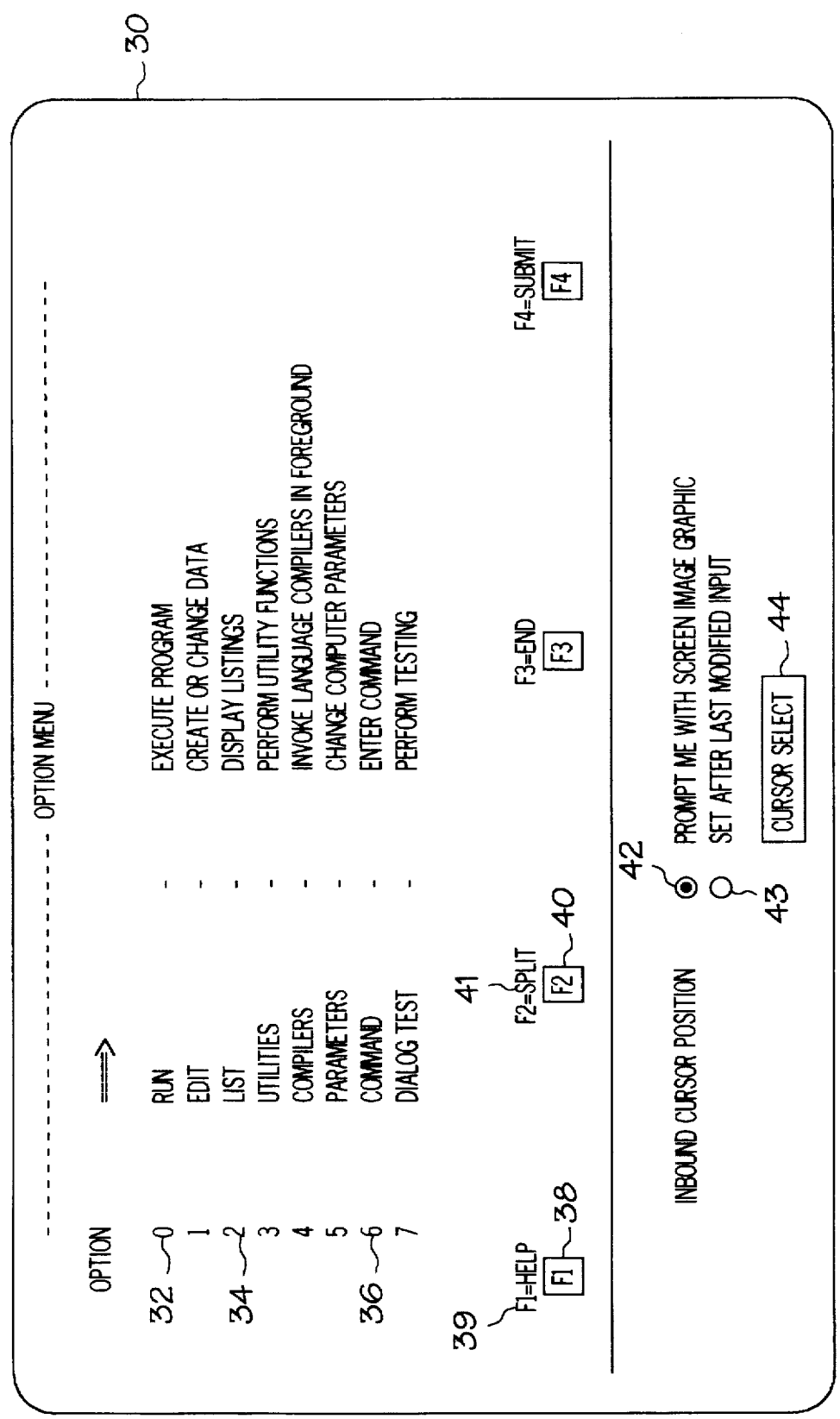
FIG. 2 shows text characters displayed on a display device, according to one embodiment of this invention.

FIG. 2 shows an HTML document of text characters received from gateway program 24 and displayed on display device 30. The content of the text characters received from host computer 20 can differ depending on the particular processing requested by the user at client computer 31. The text shown in FIG. 2 is an option menu provided by host computer 20. By selecting a particular option, or command, a user can direct host computer 20 to perform a particular task. For example, by selecting run option 32, a user can direct host computer 20 to execute a particular program. By selecting list option 34, a user can direct host computer 20 to display a certain listing. Host computer 20 can also provide functionality by responding to the activation of a function key, as shown by function key text 39 and 41. A host computer terminal has a keyboard which includes function keys which correspond to function key text 39 and 41. When a function key is pressed by a user, a function key code identifying the function key is generated and communicated to the host computer. For example, a user at a host computer terminal can press function key F1 to direct host computer 20 to send a HELP screen. Because computer keyboards may or may not contain such function keys, they are generally simulated through the use of user selectable buttons. To simulate such function keys, gateway program 24 includes in the HTML document user selectable buttons, such as function buttons 38 and 40. If the user selects function button 40, gateway program 24 translates this selection into the function key code associated with the F2 function, and communicates this information to host computer 20. Host computer 20 receives the F2 function key code, and utilizes the cursor location to determine where the screen should be split. For example, if the cursor were positioned in the word 'UTILITIES' when function button 40 were activated, host computer 20 would split the screen on the row containing the word 'UTILITIES'.

According to one embodiment of this invention, a user can select one of two options to indicate how a cursor location should be determined. If the user selects radio button 42, gateway program 24 prompts the user with an active image as discussed below. If the user selects radio button 43, gateway program 24 utilizes the text received from client computer 31, if any, to determine the location of the last modified text character, and sets the cursor location at the next text location following that location. Thus, by selecting radio button 43, the user will not be prompted with an active image for selecting a cursor location. If supported by host computer 20, cursor select button 44 can be used to simulate the light pen functionality provided by some host computers. Upon activating cursor select button 44, gateway program 24 will convert the text displayed on display device 30 into an active bitmap graphic, as described herein, and in conjunction with host computer 20 provides the appropriate light pen functionality available in some computer environments.

Figure 3:
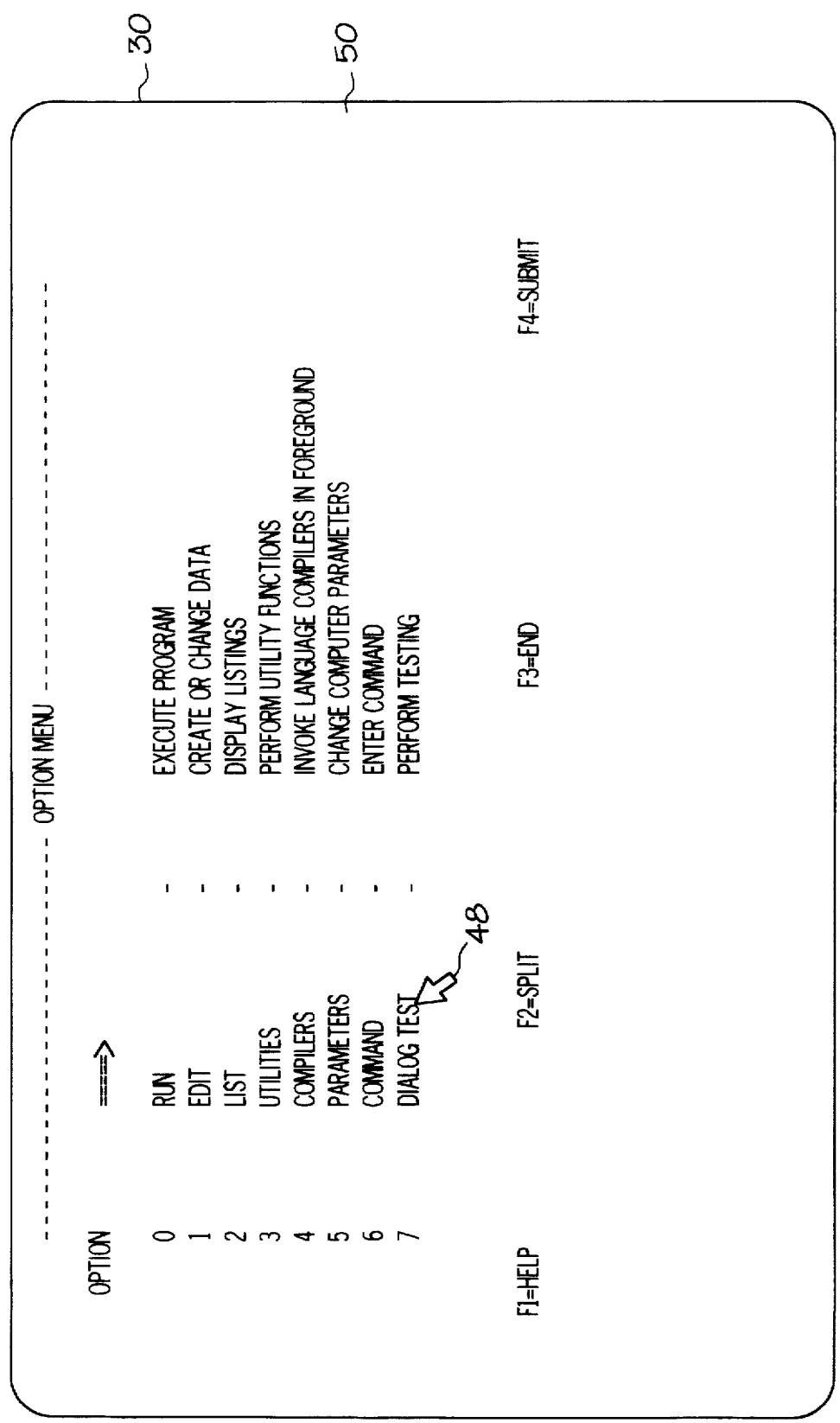
FIG. 3 is a graphic image of the text screen shown in FIG. 2 for selecting a cursor location, according to one embodiment of this invention.

Referring to FIG. 3, the active image appears on display device 30 substantially the same as the text characters appeared in FIG. 2. The user can move mouse pointer 48 to select a particular location with respect to active image 50. When the mouse pointer is at the desired location, the user activates the mouse device. The x- and y-coordinates of the pixel location of mouse pointer 48 at the time the mouse device was activated are communicated to gateway program 24. Gateway program 24 uses the x- and y-coordinates to determine the location of the text character mouse pointer 48 was positioned over when the mouse was activated.

Figure 4:
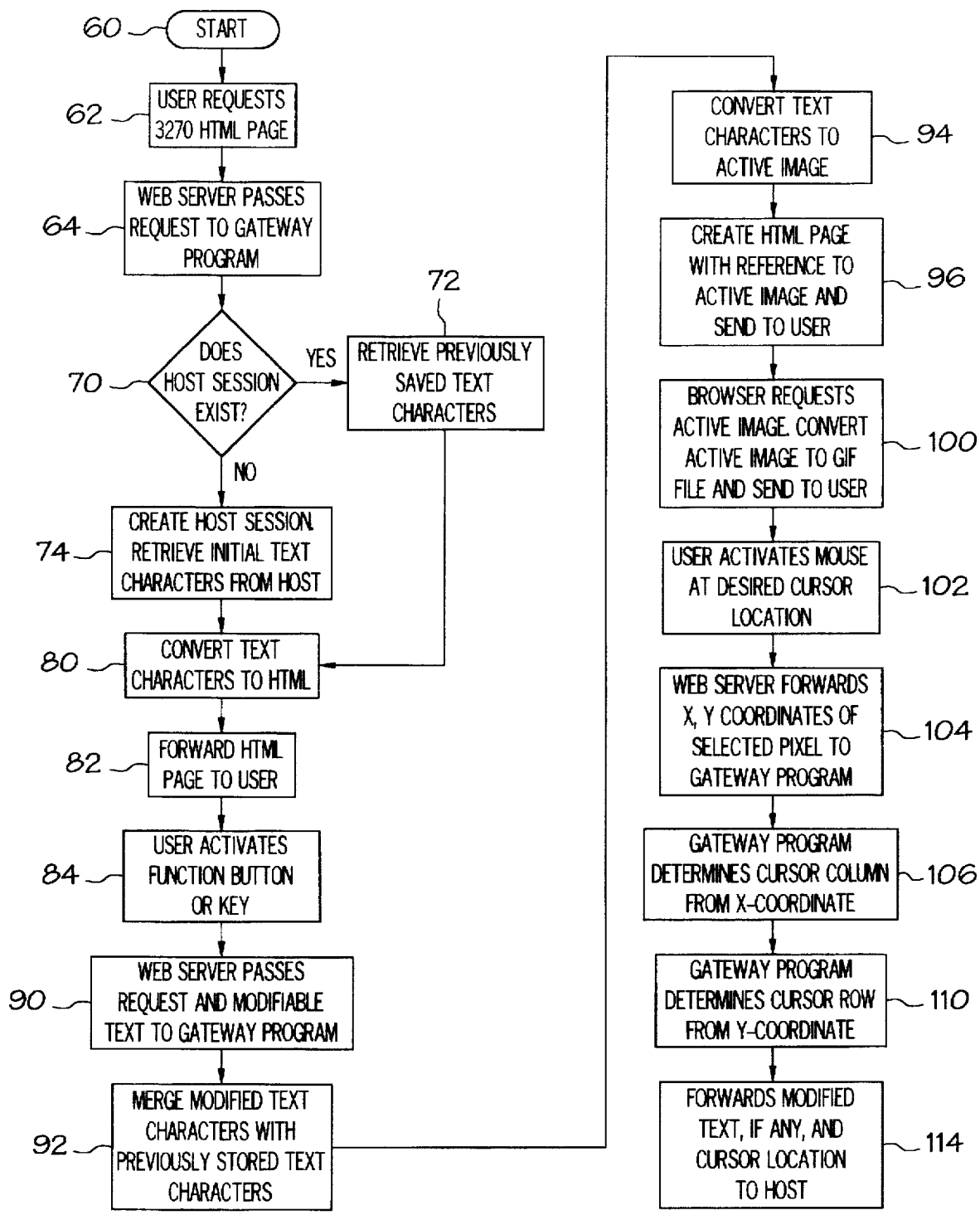
FIG. 4 is a flow diagram illustrating the method for determining the cursor location with respect to a plurality of text character locations according to one embodiment of this invention.

FIG. 4 is a flow diagram illustrating the method for determining the cursor location with respect to a plurality of displayed text characters according to one embodiment of this invention. At block 62, a user requests access to host computer 20, typically by entering a specific Uniform Resource Locator (URL) to browser 27. URLs are known in the art and are discussed in detail in *The HTML Sourcebook*, referenced above. At block 64, Web server 26 receives the request from client computer 31 and passes the request to gateway program 24. At block 70, gateway program 24 determines whether client computer 31 is participating in an ongoing session with host computer 20, or wishes to begin such a session. At block 72, if client computer 31 already has a session with host computer 20 in progress, gateway program 24 retrieves from memory the last communication from host computer 20 to client computer 31. If a session between client computer 31 and host computer 20 must be created, at block 74 gateway program 24 initiates the relevant processing to create such a session and communicates this request to host computer 20. At block 74, host computer 20 communicates to gateway program 24 the appropriate text characters relating to initiating a session. At block 80, gateway program 24 translates the text characters into an HTML document. As part of the translation process, gateway program 24 interprets the text character data stream to determine which text is modifiable and which text is not. Gateway program 24 uses appropriate HTML commands to enable the user to modify the modifiable text and prevent the user from modifying the nonmodifiable text. One way to allow modifiable text to be modified by a user is to use the HTML form command. Browser 27 interprets these commands and allows a user to edit those fields containing modifiable text characters, and prevents the user from editing those fields containing nonmodifiable text characters. At block 82, gateway program 24 communicates the HTML document via interface 28 to Web server 26. Web server 26 forwards the HTML document to client computer 31 where browser 27 displays the text on display device 30. Gateway program 24 also maintains a copy of the text received from host computer 24 in a memory.

Depending on the text displayed, and whether it contains user modifiable fields, the user at client computer 31 may modify some, all, or none of the text characters displayed on display device 30. At blocks 84 and 90, upon selection of the activation of a function button or key, browser 27 communicates any modifiable text characters and the code associated with the activated function button or key to Web server 26, which forwards the information to gateway program 24. At block 92, gateway program 24 receives the code associated with the activated function button. Gateway program 24 determines the content of the text on display device 30 at the time the function button was activated. If the text displayed on display device 30 contained only nonmodifiable text characters, then gateway program 24 need only retrieve from memory the previously stored text characters. If, however, modifiable text fields existed in the HTML document, gateway program 24 is sent the text characters from the modifiable fields, whether the text characters were actually modified or not. Gateway program 24 compares and merges the text characters it received from browser 27 with the previously saved text characters, which might contain both modifiable and nonmodifiable text characters. By such comparison, gateway program 24 can construct a record of modified fields that will later be forwarded to host computer 20; by merging the modified text into the previously saved text, gateway program 24 can determine the content of the text characters on display device 30 at the time the user selected a particular button. After gateway program 24 determines the content of the text characters displayed on display device 30 at the time the function button was activated, gateway program 24 converts the text characters into an active image at block 94. Such image will be referred to as a screen image to distinguish it from the smaller individual character images which can be used to generate the screen image.

Figure 5:
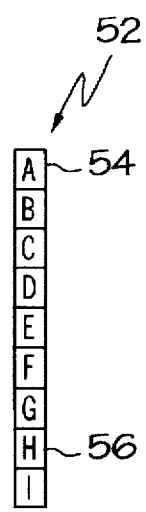
FIG. 5 is a block diagram showing a list of indexable individual character images according to one embodiment of this invention.

Algorithms for converting text characters into a graphic image are well known to those skilled in the art. According to one embodiment of this invention, gateway program 24 maintains a plurality of individual character graphic images, each individual image representing a particular displayable text character. A text character has a numerical value associated with it, which is unique to that particular character. For example, the numerical value associated with the text character 'A' is different from the numerical value associated with any other text character. The individual images can be maintained in a list which is indexable by the numerical value of the text character associated with that image. For example, referring to FIG. 5, individual graphic image 54 of the character 'A' is placed at the location in list 52 corresponding to the numerical value associated with the text character 'A'. Similarly, individual graphic image 56 of the character 'H' is placed at the location in list 52 corresponding to the numerical value associated with the text character 'H'. In this way, the list can be indexed by the value of the text character to retrieve the individual graphic image associated with that text character. Thus, the screen image can be constructed by indexing the list of individual graphic images one text character at a time. The screen image is preferably constructed such that the image appears to the user much as the original text characters displayed on display device 30 appeared.

At block 96, gateway program 24 creates an HTML document which references the generated screen image. The HTML document is then communicated to client computer 31. Browser 27 running on client computer 31 receives the HTML document, and requests from gateway program 24 the screen image referenced in the HTML document. In response to this request, gateway program 24 converts the screen image into a suitable graphic file for display, such as a GIF file. Algorithms for converting a graphic image into a GIF file are known to those skilled in the art, and are disclosed, for example, in *Programming in Graphics Files in C and C++*, pp. 218–238, published by John Wiley & Sons, Inc., the referenced portion of which is hereby incorporated by reference herein. The GIF file is then communicated to browser 27, which displays the screen image on display device 30. The active image displayed on display device 30 preferably appears much the same as the text characters appeared. The user moves mouse pointer 48 to a particular location on the active image to select a particular cursor location. At block 102, the user activates the mouse, and browser 27 forwards to Web server 26 the x- and y-coordinates of the pixel of the active image over which mouse pointer 48 was positioned at the instance the mouse was activated. The x- and y-coordinate information is then forwarded to gateway program 24 at block 104. At blocks 106 and 110, gateway program 24 uses the x- and y-coordinates of the selected pixel to determine where the cursor location should be designated.

As discussed above, a host terminal screen typically can comprise a particular number of rows and columns of text characters, or locations. For example, one popular configuration is to provide 80 columns of text characters and 24 rows of text characters, for a total of 1920 possible text character locations. Such a column-row configuration can also be referred to as an array of text characters. According to one embodiment of this invention, gateway program 24 uses the x- and y-coordinate pixel information in conjunction with individual character graphic images which have a predetermined and uniform width and height. For instance, each individual graphic image used to create the screen image can have a width of ten pixels and a height of ten pixels. An x-coordinate of 125, for example, would indicate the 13th column of text characters. A y-coordinate of 142 would indicate the 15th row of text characters. Gateway program 24 then need only determine the location at the intersection of the 13th column and the 14th row of text characters, and set the cursor position at that location. The mechanism for identifying a particular location is implementation specific, but can comprise, for example, an integer identifying the linear offset of the location with respect to the top left corner of the screen. Gateway program 24 then communicates to host computer 20 the selected cursor location, any modified text, and any activated function key.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

I claim:

1. A method for determining a specified cursor location with respect to a plurality of text characters displayed on a display device, the method comprising:

determining the content of the displayed text characters;

generating an image representative of the displayed text characters;

displaying the generated image on the display device;

selecting a location within the generated image representative of a desired cursor location with respect to the text characters; and using the relative location of the selected location within the generated image to assign a cursor location with respect to the text characters.

2. A method according to claim 1, further comprising receiving a request to indicate a cursor location with respect to the displayed text characters, before determining the content of the displayed text characters.

3. A method according to claim 1, wherein the generated image is a graphic image.

4. A method according to claim 1, further comprising translating the text characters for display on the display device before displaying the text characters on the display device.

5. A method according to claim 1, wherein the generating step comprises:

maintaining a plurality of character images, each character image representing a text character, and generating the image by combining a selected group of the character images as a function of the displayed text characters.

6. A method according to claim 1, wherein the generating an image step comprises:

maintaining a list of a plurality of character images, each character image representing a text character, each text character comprising a numerical value, the list indexable by the numerical value of a text character such that indexing the list by the numerical value of a text character retrieves the character image representing the text character having the numerical value, and forming the generated image by indexing the list with the numerical value of each text character and extracting the character image representing the text character.

7. A method according to claim 1, wherein the determining a content step comprises storing a first copy of the text characters prior to displaying the text characters, receiving data from the display device, determining if the data includes modified text character fields, and if the data does not contain modified text character fields determining that the content of the displayed text characters is the same as the stored text characters, and if the data does contain modifiable text character fields, merging the modified text character fields with the first copy of the text characters.

8. A method according to claim 1, wherein the selecting a location step comprises activating a user selection device at the location within the generated image representative of the desired cursor location.

9. A method according to claim 1, wherein the displayed text characters comprise a plurality of columns of text, and a plurality of rows of text, and wherein the using step comprises receiving an x-coordinate and a y-coordinate of the location within the generated image representative of the desired cursor location, determining from the x-coordinate a particular column of text characters, and determining from the y-coordinate a particular row of text characters, and determining the text character location at the intersection of the particular column of text characters and the particular row of text characters.

10. A method for determining a cursor location with respect to a plurality of locations on a pixel addressable display device, the method comprising:

receiving an array of text characters from a first computer;

displaying the array of text characters on the pixel addressable display device;

determining the content of the array of text characters displayed on the display device;

generating a graphic image representative of the text characters displayed on the display device;

displaying the graphic image on the display device;

selecting a pixel within the graphic image representative of a cursor location;

obtaining a pixel coordinate of the selected pixel and determining as a function of the pixel coordinate a cursor location with respect to the plurality of locations; and communicating the cursor location to the first computer.

11. A method according to claim 10, further comprising indicating an intent to specify a cursor location with respect to the plurality of locations.

12. A method according to claim 10, wherein the pixel coordinate comprises an x-coordinate and a y-coordinate.

13. A method according to claim 12, wherein the graphic image is generated from a plurality of individual character graphic images, each individual character graphic image having a predetermined height and width.

14. A system for determining a cursor location with respect to a plurality of text locations, comprising:

a program having:
- a) a first segment to receive a plurality of text characters and to translate the text characters for display on a display device coupled to a computer;
- b) a second segment to determine the content of the displayed text and to convert the displayed text characters into a graphic image,
- c) a third segment to communicate the graphic image to the display device; and
- d) a fourth segment to receive a location selected with respect to the graphic image, and to determine as a function of the location a cursor location with respect to the plurality of text locations.

15. A system according to claim 14, further comprising a fifth segment operative to receive from the computer a cursor selection request.

16. A system according to claim 14, further comprising a first memory containing a plurality of character images, each character image representing a text character, the second segment generating the graphic image by combining a selected group of the character images as a function of the displayed text characters.

17. A system according to claim 14, wherein an x-coordinate and a y-coordinate of a pixel location selected on the display device are communicated to the fourth segment.

* * * * *